United States Patent

Briggs et al.

[11] Patent Number: 5,832,305
[45] Date of Patent: Nov. 3, 1998

[54] MULTIPLE STAGE ANALOG BI-DIRECTIONAL SELECTOR UTILIZING COUPLED PAIRS OF BI-POLAR JUNCTION TRANSISTORS CONNECTED TO PULL-UP RESISTORS

[75] Inventors: Barry D. Briggs, Lilburn; Jose L. Izaguirre, Lawrenceville, both of Ga.

[73] Assignee: NCR Corporation, Dayton, Ohio

[21] Appl. No.: 753,842

[22] Filed: Dec. 2, 1996

[51] Int. Cl.$^6$ .................................................. G06F 13/14
[52] U.S. Cl. .......................... 395/871; 395/871; 370/299; 370/357; 257/577; 327/405; 327/411; 327/417; 327/478
[58] Field of Search ..................................... 395/821, 871; 370/299, 300, 301, 359, 360, 537, 538, 539, 540; 367/197; 327/405, 411, 417, 463, 474, 475, 478; 326/89; 257/565, 577

[56] References Cited

U.S. PATENT DOCUMENTS

| | | | |
|---|---|---|---|
| 3,411,019 | 11/1968 | Jörgensen | 307/243 |
| 3,835,401 | 9/1974 | Tomita et al. | 328/172 |
| 4,196,358 | 4/1980 | Conover et al. | 307/243 |
| 4,572,967 | 2/1986 | Metz | 307/243 |
| 5,027,003 | 6/1991 | Haight et al. | 307/242 |
| 5,237,211 | 8/1993 | Tanaka et al. | 307/249 |
| 5,262,681 | 11/1993 | Takeda | 307/243 |
| 5,278,958 | 1/1994 | Dewa | 395/275 |
| 5,327,018 | 7/1994 | Karlish et al. | 307/244 |
| 5,349,242 | 9/1994 | Tanaka et al. | 307/249 |
| 5,483,260 | 1/1996 | Parks et al. | 345/156 |

FOREIGN PATENT DOCUMENTS

| | | | |
|---|---|---|---|
| 357965015 | 4/1982 | Japan | G06F 15/403 |
| 406077799 | 3/1994 | Japan | H03K 17/60 |

OTHER PUBLICATIONS

Chen et al., "Two–Way Data Selector With Transfer Devices," IBM TDB, vol. 4 No. 4, p. 2184, Sep. 1981.
Bersac et al., "Integrated Bipolar Transistor Analog Switch," IBM TDB, vol. 25 No. 1, p. 333, Jun. 1982.
"CMOS Four–Input Selector," IBM TDB, vol. 33 No. 8, pp. 202–205, Jan. 1991.
"Method for Selecting More than Two Keyboards," IBM TDB, vol. 37 No. 9, p. 777, Sep. 1994.

Primary Examiner—Thomas C. Lee
Assistant Examiner—Doug Rupert
Attorney, Agent, or Firm—Paul W. Martin

[57] ABSTRACT

A multi-stage analog bi-directional selector which has a low input impedance and cost. The multi-stage analog bi-directional selector includes a plurality of analog switches including first and second bi-polar transistors coupled together at first and second connection points, a primary channel coupled to the first connection points, a plurality of data channels coupled to the second connection points, and an address circuit which causes a single one of the analog switches to form a bi-directional analog data connection between a corresponding single one of the data channels and the primary channel.

5 Claims, 3 Drawing Sheets

MULTIPLE STAGE ANALOG BI-DIRECTIONAL SELECTOR UTILIZING COUPLED PAIRS OF BI-POLAR JUNCTION TRANSISTORS CONNECTED TO PULL-UP RESISTORS

BACKGROUND OF THE INVENTION

The present invention relates to communication switching circuitry, and more specifically to a multi-stage analog bi-directional selector.

Multiplexers and de-multiplexers perform data path selection, but do not support asynchronous bi-directional communication.

Analog switches control bi-directional communication, but do not support data path selection. They also have input impedances which are too high (about 200 ohms maximum). This impedance requires a proportional increase in the voltage of the circuit which drives such a switch.

Presently, there are no low impedance devices which combine the data path selection of a multiplexer with the asynchronous bi-directional communication of an analog switch. Such a combination would be desirable, particularly for passing bi-directional TTL logic signals on a wire-or bus typical of what is found in the PC-AT keyboard, namely clock and data signals. Thus, two keyboards may be more easily connected to a single keyboard controller 49 within a computer. The computer may then choose which keyboard to communicate with.

Another application for this invention is in keyboard wedge devices, in which communication with the wedged device would occur through the keyboard's communication interface. The invention would be used in the keyboard to control placement of data from the wedged device onto the keyboard's communication channel.

Therefore, it would be desirable to provide a multi-stage analog bi-directional selector with low impedance and with low cost.

SUMMARY OF THE INVENTION

In accordance with the teachings of the present invention, a multi-stage analog bi-directional selector is provided.

The multi-stage analog bi-directional selector includes a plurality of analog switches including first and second bi-polar transistors coupled together at first and second connection points, a primary channel coupled to the first connection points, a plurality of data channels coupled to the second connection points, and an address circuit which causes a single one of the analog switches to form a bi-directional analog data connection between a corresponding single one of the data channels and the primary channel.

It is accordingly an object of the present invention to provide a multi-stage analog bi-directional selector.

It is another object of the present invention to provide a multi-stage analog bi-directional selector that has a low impedance.

It is another object of the present invention to provide a multi-stage analog bi-directional selector that is low in cost.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
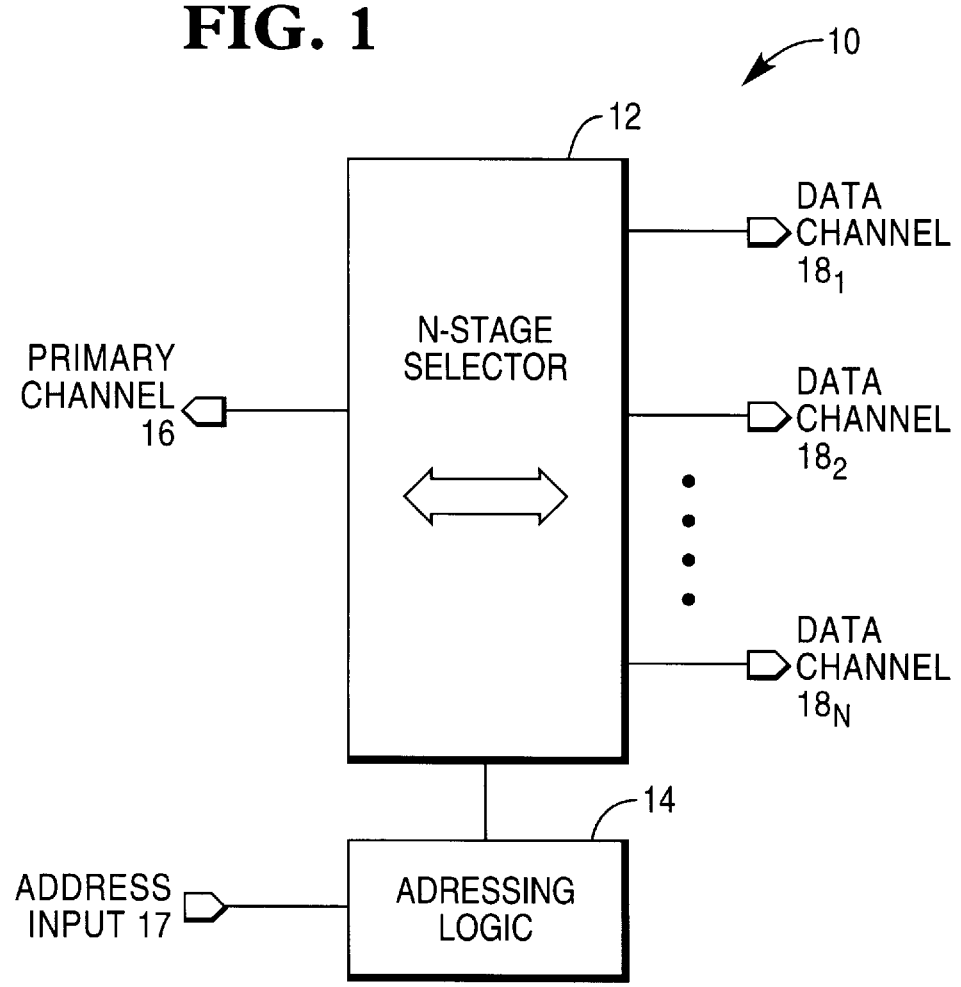
FIG. 1 is a block diagram of the multi-stage analog bi-directional selector.

Turning now to FIG. 1, multi-stage analog bi-directional selector circuit 10 includes N-stage selector 12 and addressing logic 14.

N-stage selector 12 provides bi-directional analog communication between a primary channel 16 and one of a number N of data channels $18_N$.

Addressing logic 14 determines which one of the data channels $18_N$ is connected to the primary channel 16 through N-stage selector 12. Addressing logic 14 includes address input 17.

The relationship between the number of channels N and the number of address bits B required may be defined by the equation $$N < 2^B$$

For example, two address bits B will support up to four data channels.

Figure 2:
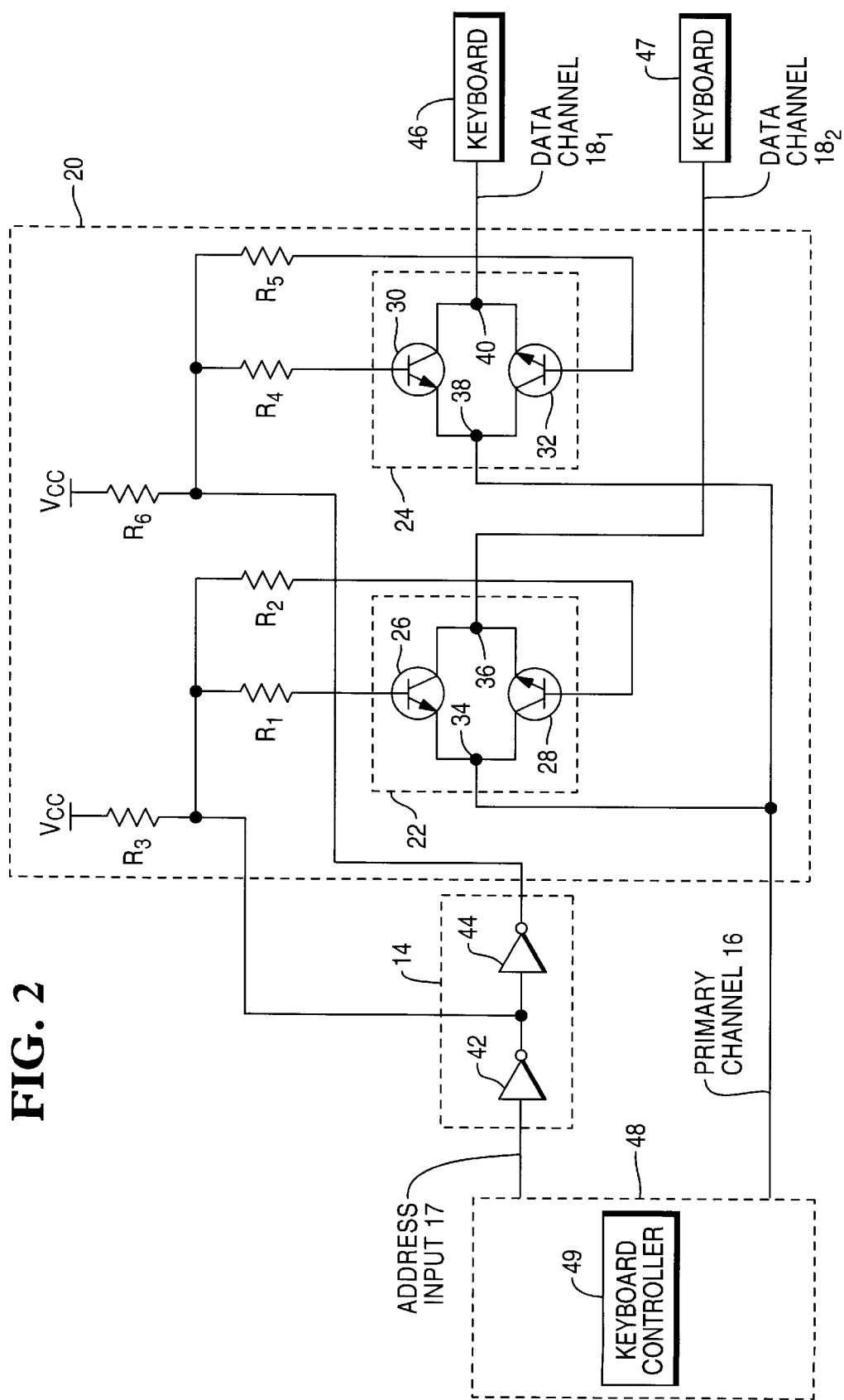
FIG. 2 is a circuit diagram of a two-stage analog bi-directional selector within a computer system including first and second keyboards.

Referring now to FIG. 2, a two-stage version of multi-stage analog bi-directional selector 10 is shown.

Two-stage selector 20 primarily includes two analog switches 22 and 24 which control bi-directional flow of TTL signals between keyboards 46 and 47 and a keyboard controller 49 within computer 48.

Switch 22 includes bi-polar transistors 26 and 28 in which the collector of one is connected to the emitter of the other. Connection 34 is coupled to computer 48 through primary channel 16, while connection 36 is connected to keyboard 47 through data channel $18_2$. The base of each transistor is connected to a bias voltage $V_{cc}$ through pull-up resistors $R_1$, $R_2$, and $R_3$.

Similarly, switch 24 includes bi-polar transistors 30 and 32 in which the collector of one is connected to the emitter of the other. Connection 38 is coupled to computer 48 primary channel 16, while connection 40 is connected to keyboard 46 through data channel $18_1$. The base of each transistor is connected to a bias voltage $V_{cc}$ through pull-up resistors $R_4$, $R_5$, and $R_6$.

A nominal value for resistors $R_1$, $R_2$, $R_4$, and $R_5$, is 10K ohms. A nominal value for resistors $R_3$ and $R_6$ is 4.7K ohms.

In both switches 22 and 24, bi-polar transistors are employed because they require only a nominal bias voltage $V_{cc}$ of five volts. Bi-polar transistors 26, 28, 30, and 32 have a model number of 2N3904.

Field effect transistors (FETs) are not employed because they present many challenges that would ultimately increase the cost of selector 10 to solve them. N-type FETs are less expensive than P-type and also offer lower resistance than corresponding P-types. However, n-type FETs are still relatively expensive and require a more expensive control circuit since they require voltage in excess of five volts (typically a $V_{cc}$ of 7 to 10 volts) to assure the minimum turn-on resistance.

All FETs have an intrinsic diode that provides a signal path in one direction through the diode, even though the FET is off. To prevent the diode path operation, it is necessary to connect two FETs in series such that the intrinsic diodes face opposite directions and hence do not provide a conduction path in either direction. Using two FETs connected like this works well, allowing the FET's on state to control the connection of the bi-directional signal path. However, using two FETs in series doubles the channel resistance so that lower channel resistance devices must be selected to limit voltage drop across the FET switch.

Bipolar transistors are typically almost half the cost of a corresponding FET, and do not require a high voltage supply to control them. Furthermore, bipolar transistors contain no intrinsic diode so they can be connected in parallel, with one device offering a conduction path for each polarity of signal. If the bipolar devices are driven to saturation in the "on" state, there is a predictable voltage drop of typically less than 0.2 volts.

An important advantage associated with the design of selector 10 is that the variation of pull-up resistors from different keyboard vendors does not materially affect the operation of the selector 10, since the voltage drop can be predicted. This is unlike the FET solution in which the channel resistance of both devices is added and the current supplied by the keyboard pull-up resistor causes a voltage drop that is predictable, but varies widely with different keyboards.

Since bipolar devices are involved, the control impedance is lower than a FET, however in this circuit, the control voltage is relatively high, because the β of the transistor multiplies the control current supplied by the on control circuit. Hence a relatively small control current (0.1 ma) can control a fairly large signal current (10 ma with a β of 100).

Addressing logic 14 includes two inverters 42 and 44 which determine which of data channels $18_1$ and $18_2$ is connected to computer 48 through primary channel 16. The keyboard controller 49 within computer 48 determines which of keyboards 46 and 47 is connected by producing an address input signal at address input 17.

Operation requires only a single-digit address. When address input 17 is high, inverter 42 produces a low output which causes transistors 26 and 28 of switch 22 to turn off and data channel $18_2$ to be deselected. Inverter 44 produces a high output which causes transistors 30 and 32 of switch 24 to turn on and data channel $18_1$ to be selected.

Similarly, when address input 17 is low, inverter 42 produces a high output which causes transistors 26 and 28 of switch 22 to turn on and data channel $18_2$ to be selected. Inverter 44 produces a low output which causes transistors 30 and 32 of switch 24 to turn off and data channel $18_1$ to be deselected.

Figure 3:
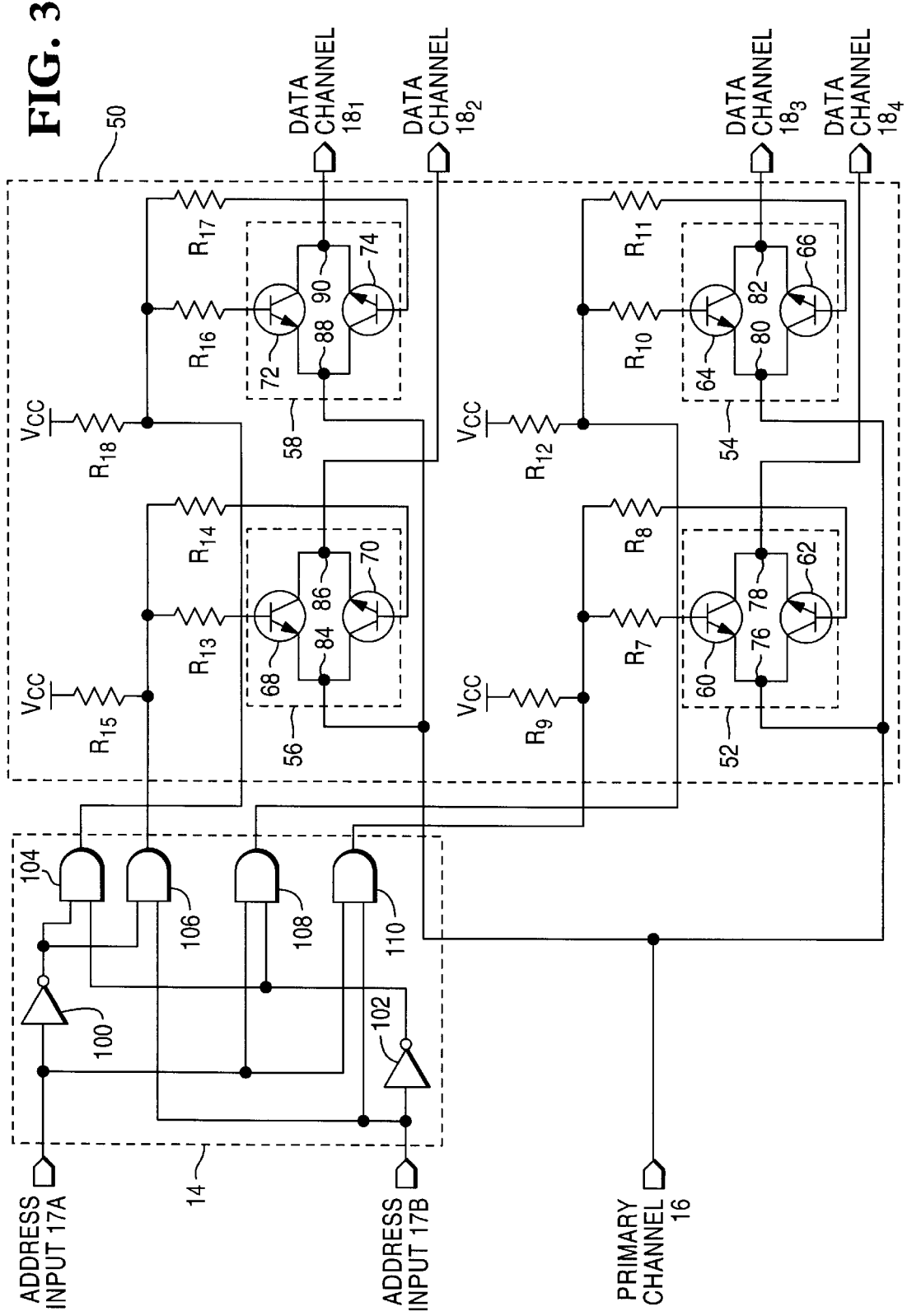
FIG. 3 is a circuit diagram of a four-stage analog bi-directional selector.

Referring now to FIG. 3, a four-stage version of multi-stage analog bi-directional selector 10 is shown.

Four-stage selector 50 primarily includes four analog switches 52, 54, 56, and 58. Switch 52 includes bi-polar transistors 60 and 62 in which the collector of one is connected to the emitter of the other. Connection 76 is coupled to primary channel 16, while connection 78 is connected to data channel $18_4$. The base of each transistor is connected to a bias voltage $V_{cc}$ through pull-up resistors $R_7$, $R_8$, and $R_9$.

Switch 54 includes bi-polar transistors 64 and 66 in which the collector of one is connected to the emitter of the other. Connection 80 is coupled to primary channel 16, while connection 82 is connected to data channel $18_3$. The base of each transistor is connected to a bias voltage $V_{cc}$ through pull-up resistors $R_{10}$, $R_{11}$, and $R_{12}$.

Switch 56 includes bi-polar transistors 68 and 70 in which the collector of one is connected to the emitter of the other. Connection 84 is coupled to primary channel 16, while connection 86 is connected to data channel $18_2$. The base of each transistor is connected to a bias voltage $V_{cc}$ through pull-up resistors $R_{13}$, $R_{14}$, and $R_{15}$.

Finally, switch 58 includes bi-polar transistors 72 and 74 in which the collector of one is connected to the emitter of the other. Connection 88 is coupled to primary channel 16, while connection 90 is connected to data channel $18^1$. The base of each transistor is connected to a bias voltage $V_{cc}$ through pull-up resistors $R_{16}$, $R_{17}$, and $R_{18}$.

Similar to the two-stage embodiment of FIG. 2, bi-polar transistors are employed because they require only a nominal bias voltage $V_{cc}$ of five volts.

A nominal value for resistors $R_7$, $R_8$, $R_{10}$, $R_{11}$, $R_{13}$, $R_{14}$, $R_{16}$, and $R_{17}$ is 10K ohms. A nominal value for resistors $R_9$, $R_{12}$, $R_{15}$, and $R_{18}$ is 4.7K ohms.

Addressing logic 14 includes two inverters 100 and 102 and four AND gates which determine which of data channels $18_1$, $18_2$, $18_3$, or $18_4$ is connected to primary channel 16.

Operation requires a two-digit address and is illustrated by Table I:

TABLE I

| Address 17A | Address 17B | Data Channel |
| --- | --- | --- |
| Low | Low | $18_1$ |
| Low | High | $18_2$ |
| High | Low | $18_3$ |
| High | High | $18_4$ |

Although the present invention has been described with particular reference to certain preferred embodiments thereof, variations and modifications of the present invention can be effected within the spirit and scope of the following claims.

What is claimed is:

1. An analog selector for coupling either a first or second keyboard to a computer comprising:

a first analog switch including first and second bi-polar transistors coupled together at first and second connection points;

a second analog switch including first and second bi-polar transistors coupled together at first and second connection points;

wherein the first and second bi-polar transistors of the first and second analog switches comprises a base, a collector, and an emitter;

wherein the collectors of the first bi-polar transistors are coupled to the emitters of the second bi-polar transistors to form the first connection points;

wherein the collectors of the second bi-polar transistors are coupled to the emitters of the first bi-polar transistors to form the second connection points;

first and second groups of pull-up resistors, which couple the bases of the bi-polar transistors of the first and second analog switches to a voltage source, each group including a first resistor coupled to the base of the second bi-polar transistor at a first end, a second resistor coupled to the base of the first bi-polar transistor at a first end and to a second end of the first resistor at a second end to form first and second junction points, and a third resistor coupled between the first and second junction points and the voltage source;

a primary channel coupled to the first connection points of the first and second analog switches and to a keyboard controller within the computer;

a first data channel coupled to the second connection point of the first analog switch and to the first keyboard;

a second data channel coupled to the second connection point of the second analog switch and to the second keyboard; and an address circuit coupled to the keyboard controller which causes a single one of the first and second analog switches to form a bi-directional analog data connection between a corresponding single one of the first and second data channels and the primary channel in response to an address input signal from the keyboard controller.

2. The analog selector as recited in claim 1, wherein the address circuit comprises:

an inverter coupled between the first and second junction points.

3. The analog selector as recited in claim 2, wherein the address circuit further comprises:

another inverter coupled between the first junction point and the keyboard controller.

4. An analog selector for coupling either a first or second keyboard to a computer comprising:

a first analog switch including first and second bi-polar transistors coupled together at first and second connection points;

wherein the first and second bi-polar transistors of the first analog switch comprise a base, a collector, and an emitter;

wherein the collector of the first bi-polar transistor of the first analog switch is coupled to the emitter of the second bi-polar transistor of the first analog switch to form a first connection point of the first analog switch;

wherein the collector of the second bi-polar transistor of the first analog switch is coupled to the emitter of the first bi-polar transistor of the first analog switch to form a second connection point of the first analog switch;

a second analog switch including first and second bi-polar transistors coupled together at first and second connection points;

wherein the first and second bi-polar transistors of the second analog switch comprise a base, a collector, and an emitter;

wherein the collector of the first bi-polar transistor of the second analog switch is coupled to the emitter of the second bi-polar transistor of the second analog switch to form a first connection point of the second analog switch;

wherein the collector of the second bi-polar transistor of the second analog switch is coupled to the emitter of the first bi-polar transistor of the second analog switch to form a second connection point of the second analog switch;

a primary channel coupled to the first connection points of the first and second analog switches and to a keyboard controller within the computer;

a first data channel coupled to the second connection point of the first analog switch and to the first keyboard;

a second data channel coupled to the second connection point of the second analog switch and to the second keyboard;

first and second groups of pull-up resistors, which couple the bases of the bi-polar transistors of the first and second analog switches to a voltage source, each group including a first resistor coupled to the base of the second bi-polar transistor at a first end, a second resistor coupled to the base of the first bi-polar transistor at a first end and to a second end of the first resistor at a second end to form first and second junction points, and a third resistor coupled between the first and second junction points and the voltage source; and an address circuit coupled to the keyboard controller which causes a single one of the first and second analog switches to form a bi-directional analog data connection between a corresponding single one of the first and second data channels and the primary channel in response to an address input signal from the keyboard controller including an inverter coupled between the first and second junction points.

5. A computer system comprising:

a computer including a keyboard controller; and an analog selector for coupling either a first or second keyboard to the keyboard controller including a first analog switch including first and second bi-polar transistors coupled together at first and second connection points;

a second analog switch including first and second bi-polar transistors coupled together at first and second connection points;

wherein the first and second bi-polar transistors of the first and second analog switches comprises a base, a collector, and an emitter;

wherein the collectors of the first bi-polar transistors are coupled to the emitters of the second bi-polar transistors to form the first connection points;

wherein the collectors of the second bi-polar transistors are coupled to the emitters of the first bi-polar transistors to form the second connection points;

first and second groups of pull-up resistors, which couple the bases of the bi-polar transistors of the first and second analog switches to a voltage source, each group including a first resistor coupled to the base of the second bi-polar transistor at a first end, a second resistor coupled to the base of the first bi-polar transistor at a first end and to a second end of the first resistor at a second end to form first and second junction points, and a third resistor coupled between the first and second junction points and the voltage source;

a primary channel coupled to the first connection points of the first and second analog switches and to a keyboard controller within the computer;

a first data channel coupled to the second connection point of the first analog switch and to the first keyboard;

a second data channel coupled to the second connection point of the second analog switch and to the second keyboard; and an address circuit coupled to the keyboard controller which causes a single one of the first and second analog switches to form a bi-directional analog data connection between a corresponding single one of the first and second data channels and the primary channel in response to an address input signal from the keyboard controller.

* * * * *